United States Patent
Kodweiss et al.

(10) Patent No.: US 6,830,024 B2
(45) Date of Patent: Dec. 14, 2004

(54) SUCTION SYSTEM FOR AN INTERNAL-COMBUSTION ENGINE

(75) Inventors: Juergen Kodweiss, Weissach (DE); Wolfgang Horlacher, Leonberg-Ramtel (DE); Juergen Schorn, Rutesheim (DE); Andreas Fritz, Oetisheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/217,131

(22) Filed: Aug. 13, 2002

(65) Prior Publication Data

US 2003/0041832 A1 Mar. 6, 2003

(30) Foreign Application Priority Data

Aug. 14, 2001 (DE) ...................................... 201 13 496 U

(51) Int. Cl.[7] .............................................. F02M 35/10
(52) U.S. Cl. ............................ 123/184.53; 123/184.57; 181/229
(58) Field of Search ....................... 123/184.53, 184.57; 181/229

(56) References Cited

U.S. PATENT DOCUMENTS

| | | | |
|---|---|---|---|
| 4,874,062 A | 10/1989 | Yanagida et al. | |
| 5,839,405 A | * 11/1998 | Falkowski et al. | 123/184.57 |
| 6,314,931 B1 | * 11/2001 | Yasuda et al. | 123/184.53 |
| 6,328,011 B1 | * 12/2001 | Jessberger et al. | 123/184.57 |

FOREIGN PATENT DOCUMENTS

| | | |
|---|---|---|
| DE | 198 27 410 A | 1/1999 |
| DE | 199 31 934 A | 1/2000 |
| DE | 199 02 951 A | 7/2000 |
| DE | 199 24 870 A | 11/2000 |

* cited by examiner

*Primary Examiner*—Noah P. Kamen
(74) *Attorney, Agent, or Firm*—Crowell & Moring LLP

(57) ABSTRACT

A suction system for an internal-combustion engine is provided with at least one container, which can be connected by way of feed pipes with the intake ports of a cylinder head. Openings of the intake ports for charge cycle control are monitored by valves. In the container or in the feed pipes, at least one reflection chamber is provided, which is connected with the interior volume of the container by way of a hole structure. The hole structure is formed by a plurality of openings that are formed in a wall section of the container, and are closed off by a cover fastened to the exterior side of the container wall, providing a reflection chamber which reduces noise in the suction system without adversely affecting air flow in the interior of the suction system.

6 Claims, 3 Drawing Sheets

SUCTION SYSTEM FOR AN INTERNAL-COMBUSTION ENGINE

BACKGROUND AND SUMMARY OF THE INVENTION

This application claims the priority of German patent document 201 13 496.9, filed Aug. 14, 2001, the disclosure of which is expressly incorporated by reference herein.

The invention relates to a suction system for an internal-combustion engine.

The reduction of noise emissions of highly developed internal-combustion engines is a high-priority task in which components, such as the suction system, the air filters, or the like have special significance. The high gas dynamics within the suction system are such that high flow velocities are generated. At various radii and transitions in the suction system, this leads to flow perturbations, which excite the air volume in a broad range of frequencies, resulting in a corresponding generation of noise.

German Patent Document DE 198 27 410 A1 describes an intake port of an internal-combustion engine in which an interior structure acts as a resonator chamber, so that intake noises which occur at certain frequencies are muffled. The interior structure provided with the openings is in this case mounted in the collecting space of the suction pipe. However, such insertion structures may have a disadvantageous influence on the rate of air flow.

It is therefore an object of the invention to provide a resonator chamber or reflection chamber which muffles intake noises for a suction system of an internal-combustion engine, without impairing the air inflow into the suction pipe.

Another object of the invention is to produce such a reflection chamber using simple manufacturing techniques.

Still another object of the invention is to provide a reflection chamber which remains reliably fastened to the suction system of the internal-combustion engine for the entire running time of the engine.

These and other objects and advantages are achieved by the suction system according to the invention, in which the openings required to form the resonator chamber are provided in the wall section of the container of the suction system, and are closed off by a cover that seals off the openings toward the outside. As a result, the flow-optimized interior structure of the suction system remains unchanged, and the inflow behavior of the taken-in combustion air is not affected.

Both the container and cover which seals off the openings are advantageously made of a plastic material, and are preferably connected with one another by vibration welding. To obtain a reliable and secure weld seam connection, a web arranged on the exterior side of the container and surrounding the openings is provided as a weld seam for the vibration welding. So that the welding expulsion is fixed during the welding operation, respective interior and an exterior webs extending parallel to the center web are used to limit the welding expulsion.

Other objects, advantages and novel features of the present invention will become apparent from the following detailed description of the invention when considered in conjunction with the accompanying drawings.

DETAILED DESCRIPTION OF THE INVENTION

Figure 1:
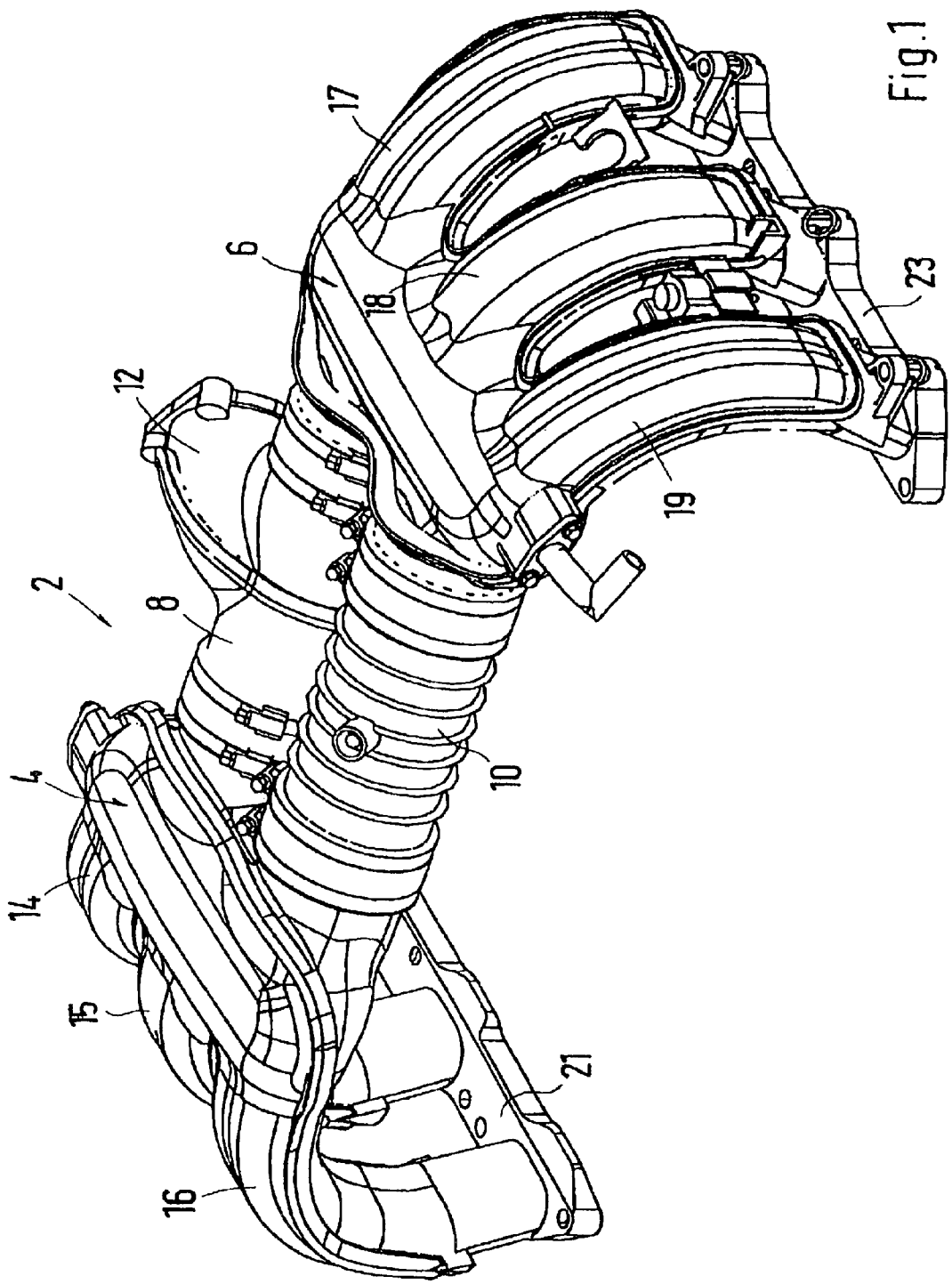
FIG. 1 is an exploded view of a suction system of a multi-cylinder internal-combustion engine.

The suction system 2 shown in FIG. 1 is constructed for a 6-cylinder opposed-cylinder engine. Resonance containers 4,6 for the respective cylinder rows are connected with one another by way of two connection pipes 8 and 10. Connection pipe 8 is constructed as a distributor pipe and connection pipe 10 is constructed as a resonance pipe with a switchable flap. In a known manner, the throttle valve housing (not shown) is fastened to the distributor pipe 8 by way of a connection pipe 12. From the two resonance containers 4 and 6, each of the individual pipes 14 to 16 and 17 to 19 leads to a respective cylinder head (not shown) to which the individual pipes are fastened by way of corresponding flanges 21 and 23.

The construction of the two resonance containers 4 and 6 will be explained as an example with reference to the resonance container 4 assigned to the left cylinder bank row, because the construction of the resonance container 6 provided for the right cylinder bank row is the same.

Figure 2:
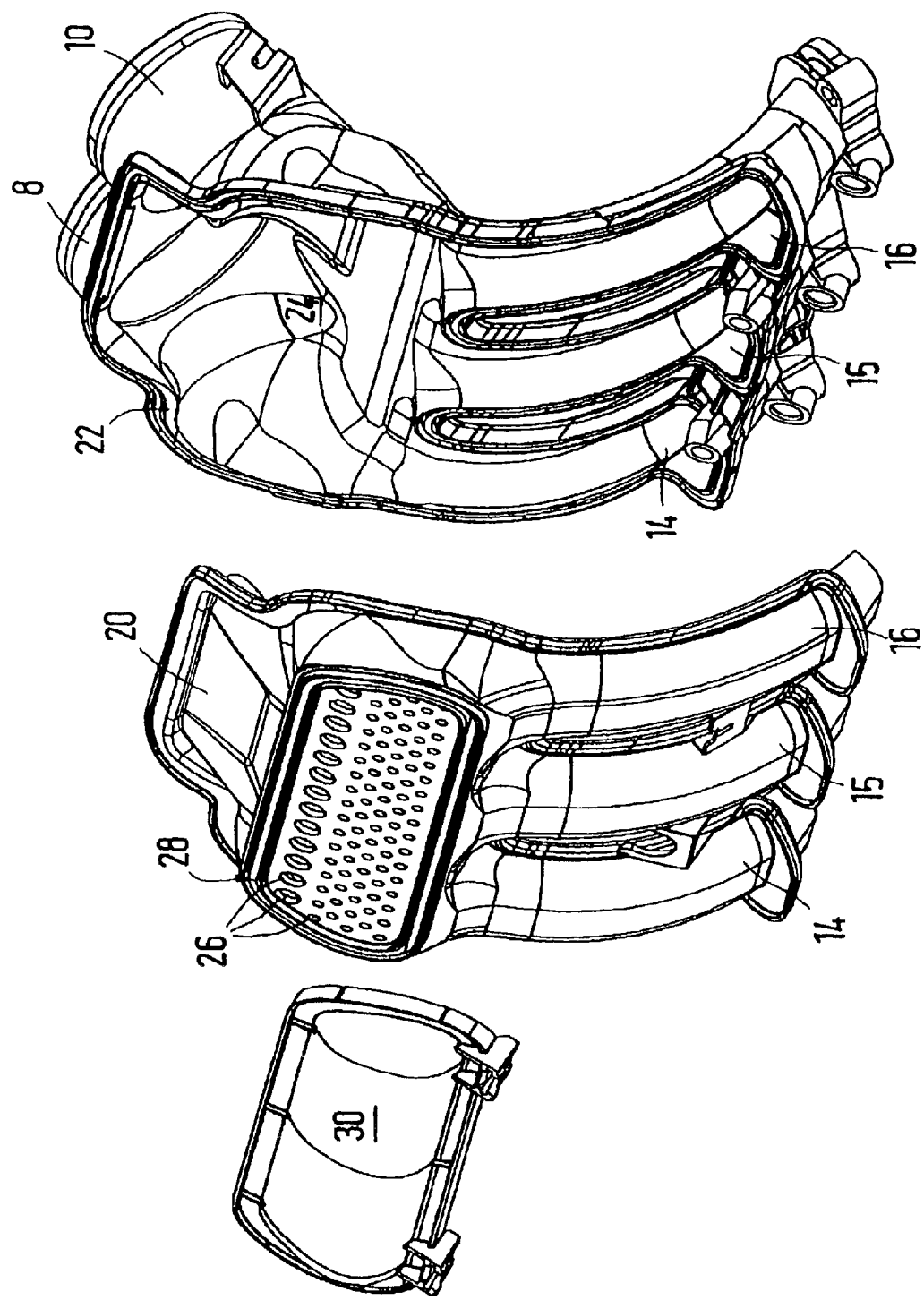
FIG. 2 is an exploded view of a part of the suction system.
Figure 3:
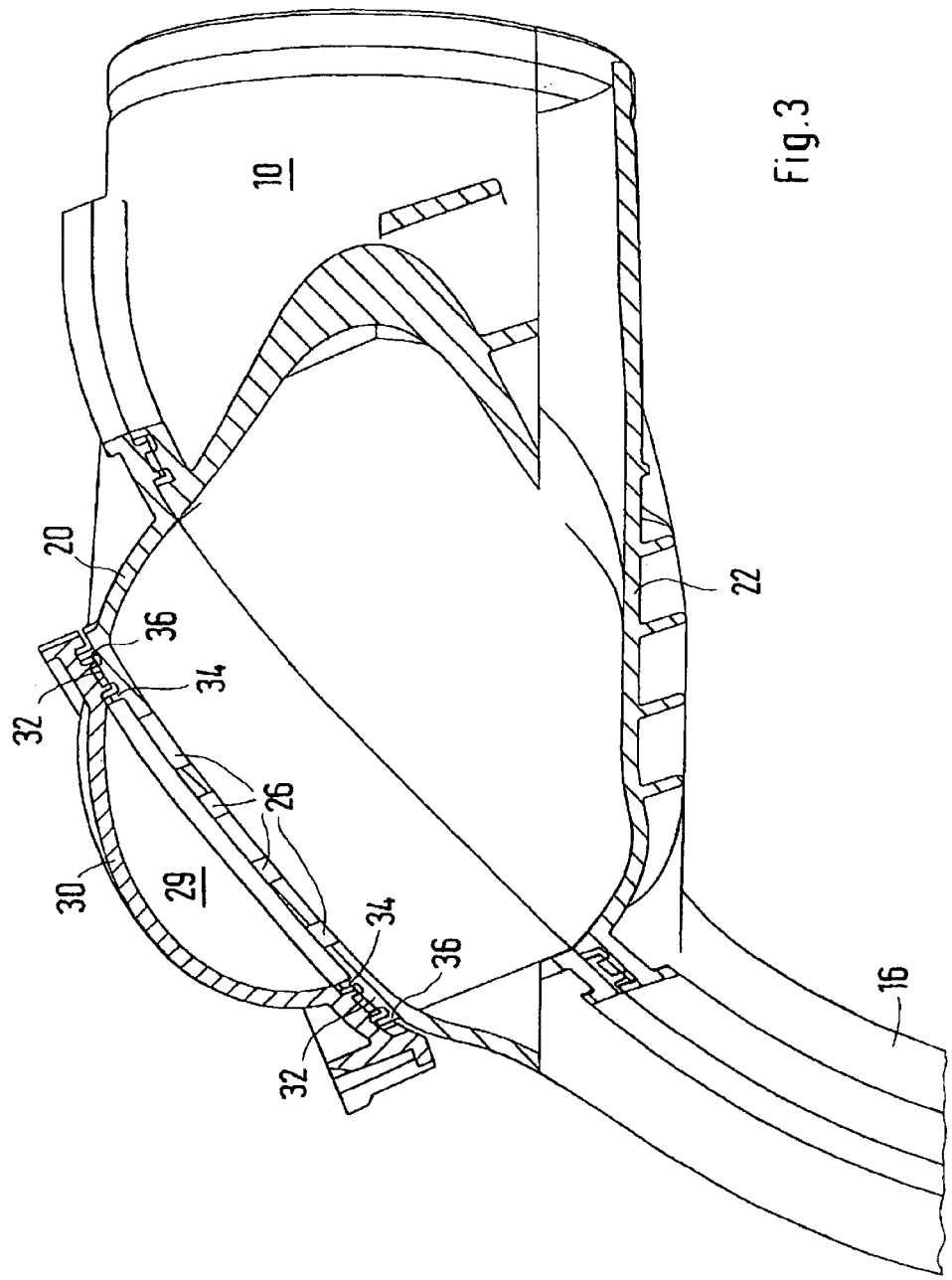
FIG. 3 is a sectional view of the suction system in the area of a resonator chamber.

As illustrated in FIG. 2, the resonance container 4 and the individual pipes 14 to 16 connected thereto in a single piece, are produced by a two-shell technique, in which a top shell 20 is joined to a bottom shell 22 by vibration welding. The intake air flows through a resonance space 24 constructed in the resonance container 4, into the cylinder head (by way of the individual pipes 14 to 16), and thus into the combustion space of the individual cylinders. In the top shell 20, a wall section 28 provided with openings 26 is part of a reflection or resonator chamber 29 (FIG. 3) that is coupled to the resonance space 24.

The perforated wall section 28 is closed off toward the outside by a cover 30 that is fastened to the resonance container 4 by vibration welding. For this purpose, the perforated wall section 28 is framed by a surrounding web 32 which is used as a weld seam for the two components 20 and 30 consisting of plastic material. So that the plastic material, which liquefies during the vibration welding, can flow neither to the inside into the reflection chamber 29, nor to the outside, interior and exterior webs 34,36 are provided parallel to the surrounding web to limit or receive the welding expulsion. The reflection chamber 29 linked to the resonance space 24 by way of the openings 26 helps to reduce the noises which occur because of the high flow velocities of the intake air masses, and the flow perturbations that occur at the various radii and transitions in the suction system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A suction system for an internal-combustion engine, comprising:

at least one resonance container that encloses a resonance space in an interior volume thereof, which is connected by way of feed pipes with intake ports of a cylinder head of the internal combustion engine; and at least one reflection chamber arranged on the resonance container, which reflection chamber is connected with said resonance space by way of a hole structure; wherein said hole structure comprises openings that are provided in a wall section of the resonance container;

the openings are closed off by a cover which is fastened to the exterior side of the resonance container wall, and which defines said reflection chamber.

2. The suction system according to claim 1, wherein:

the container and the cover are made of plastic material; and the container and the cover are connected with one another by vibration welding.

3. The suction system according to claim 1, wherein the openings provided in the wall section of the container are surrounded by a web which forms a weld seam for the vibration welding.

4. The suction system according to claim 3, further comprising an interior and exterior webs that extend parallel to the web and limit welding expulsion.

5. A suction system for an internal combustion engine, comprising:

a resonance space defined by a resonance container arranged in a gas flow path of said suction system, connected with feed pipes for connection to intake ports for said engine;

a hole structure comprising a plurality of holes arranged in a wall of said resonance container in an area of said resonance space; and a cover which is connected at a periphery thereof to an exterior of said wall, at a locus surrounding said hole structure, forming a reflection chamber that is coupled in fluid communication with said interior space via said hole structure.

6. A suction system for an internal combustion engine, comprising:

at least one resonance container which defines a resonance space therein;

a plurality of feed pipes connected to said resonance space, for conducting flow of air from said resonance space to intake ports of a cylinder head of the internal combustion engine; and at least one reflection chamber which adjoins a wall section of said at least one resonance container and is connected to said resonance space by way of a hole structure; wherein, said hole structure comprises a plurality of openings that are provided in said wall section of said at least one resonance container; and the reflection chamber is defined by a cover that is fastened to an exterior side of said wall section and closes off said openings.

* * * * *